US012664063B2

(12) United States Patent
Song et al.

(10) Patent No.:     US 12,664,063 B2
(45) Date of Patent:          Jun. 23, 2026

(54) RELIABILITY AVAILABILITY SERVICEABILITY (RAS) SERVICE FRAMEWORK

(71) Applicant: Intel Corporation, Santa Clara, CA (US)

(72) Inventors: Chuan Song, Shanghai (CN); Mohan J. Kumar, Aloha, OR (US); Feng Jiang, Shanghai (CN); Yang Zhang, Shanghai (CN); Chong Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/854,449

(22) Filed: Jun. 30, 2022

(65) Prior Publication Data

US 2022/0374320 A1     Nov. 24, 2022

(30) Foreign Application Priority Data

Jun. 14, 2022    (WO) ................ PCT/CN2022/098629

(51) Int. Cl.
G06F 11/00          (2006.01)
G06F 11/07          (2006.01)
G06F 11/20          (2006.01)

(52) U.S. Cl.
CPC ...... G06F 11/2048 (2013.01); G06F 11/0757 (2013.01); G06F 11/2028 (2013.01); G06F 2201/85 (2013.01)

(58) Field of Classification Search
CPC ............ G06F 11/0757; G06F 11/2028; G06F 11/2035; G06F 11/2043; G06F 11/2048; G06F 2201/85
See application file for complete search history.

(56) References Cited

U.S. PATENT DOCUMENTS

| | | | | |
|---|---|---|---|---|
| 7,555,671 B2* | 6/2009 | Nachimuthu | ......... | G06F 9/4812 |
| | | | | 714/1 |
| 8,578,138 B2* | 11/2013 | Natu | ................ | G11C 11/40615 |
| | | | | 712/228 |
| 11,036,543 B1* | 6/2021 | Swanson | .............. | G06F 13/102 |

(Continued)

OTHER PUBLICATIONS

All Things Distributed, "Tech Predictions for 2022 and Beyond", https://www.allthingsdistributed.com/2021/12/tech-prediction-for-2022-and-beyond.html, Dec. 2, 2021, 7 pages.

(Continued)

*Primary Examiner* — Marc Duncan
(74) *Attorney, Agent, or Firm* — Compass IP Law PC

(57)          ABSTRACT
Examples described herein relate to execution of multiple Reliability Availability Serviceability (RAS) processes on different processors of the at least two processors to provide fallback from a first RAS process to a second RAS process executing on a processor of the at least two processors based on failure or timeout of the first RAS process. In some examples, the different processors comprise independently operating processors whereby failure or inoperability of one of the different processors is independent of another of the different processors. In some examples, failure or timeout of the first RAS process comprises failure of the second RAS process to receive an operating status signal from the first RAS process.

17 Claims, 5 Drawing Sheets

(56) References Cited

U.S. PATENT DOCUMENTS

2017/0364422 A1\* 12/2017 Antony ................. G06F 11/079
2023/0269126 A1\* 8/2023 Parthasarathy ....... G06F 9/5027
709/223

OTHER PUBLICATIONS

Belshe, M. et al., "Hypertext Transfer Protocol Version 2 (HTTP/2)", Internet Engineering Task Force, https://datatracker.ietf.org/doc/html/rfc7540, May 2015, 96 pages.
Chandra, Yash Suresh, "Inner view of protobuf encoding", Search Medium, https://medium.com/@yashschandra/an-inner-view-to-protobuf-encoding-e668f37847d5, Mar. 20, 2020, 14 pages.
Cooney, Michael, "Intel details IPU roadmap to free up CPUS", Network World, https://www.networkworld.com/article/3659883/intel-details-ipu-roadmap-to-free-up-cpus.html, May 10, 2022, 3 pages.
Peon R. and Ruellan H., "HPACK: Header Compression for HTTP/2", Internet Engineering Task Force, https://datatracker.ietf.org/doc/html/rfc7541, May 2015, 55 pages.

\* cited by examiner

RELIABILITY AVAILABILITY SERVICEABILITY (RAS) SERVICE FRAMEWORK

RELATED APPLICATION

This application claims the benefit of priority to Patent Cooperation Treaty (PCT) Application No. PCT/CN2022/098629, filed Jun. 14, 2022. The entire content of that application is incorporated by reference.

BACKGROUND

Some Reliability Availability Serviceability (RAS) flows utilize a runtime System Management Mode Interrupt (SMI) to interrupt host central processing unit (CPU) service to perform a corrective action in response to an interrupt such as correctable or uncorrectable memory errors, Peripheral Component Interconnect express (PCIe) link or device errors, etc. Runtime SMI are a source of performance variability to the host as servicing the SMI cause a stall or halt of CPU core operation. Stopping and resuming operation of processing involves time-intensive acts of saving a state of a currently-executing process to a stack, reloading the state, and resuming operation of the process. Out of band (OOB) RAS offloads RAS runtime services from System Management Mode (SMM) privilege level to an out of band Board Management Controller (BMC). Offloading RAS runtime services to BMC can help reduce runtime SMIs interruptions of CPU cores. However, interruption to operation of the BMC can lead to failure of RAS runtime service. BMC reset latency can be a time duration of seconds, which can be too long a down time for RAS flows.

DETAILED DESCRIPTION

At least to potentially address RAS runtime downtime from failure of a BMC, RAS runtimes can be executed on multiple core partitions with independent exception and reset domains. OOB RAS runtimes can execute as a primary and secondary threads. A primary thread can execute in primary core partition and a secondary thread can execute in a secondary core partition. The different core partitions can include independent hardware exception and reset circuitry. The different core partitions can utilize different power domains (e.g., different power supplies) and different reset control logic. If an RAS event handler runtime fails on a first core partition, another RAS event handler runtime executing on a second core partition can continue performance of RAS so that RAS runtime functions can continue without availability degradation. Availability degradation from RAS runtime may be reduced when there are exceptions or resets arising from a RAS service core. Overall system level availability can be improved by removing a single point failure dependency on a single RAS service core. A resilient RAS runtime service framework can support dynamic migration of a RAS runtime among different processor partitions to provide for failover operation of a RAS runtime.

For example, a BMC can be utilized to execute RAS event handler runtime services on primary and secondary cores that independently operate. If a primary BMC core fails, a secondary BMC core can perform RAS runtime service. Although examples are described with respect to a BMC, other devices capable of executing processes independently such that if a RAS event handler runtime service were to fail or stall, another RAS runtime service can be performed.

Figure 1:
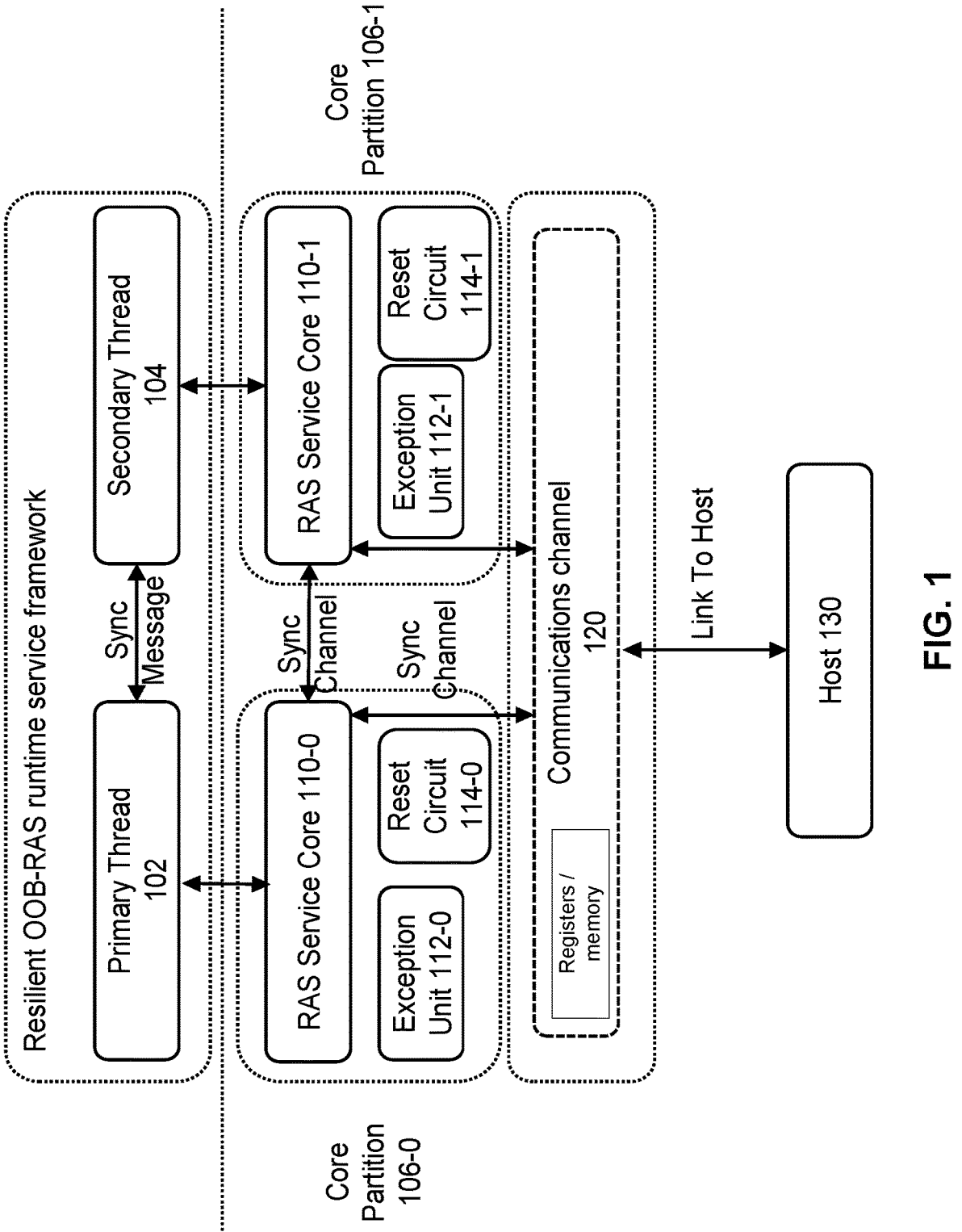
FIG. 1 depicts an example system.

FIG. 1 depicts an example system. Primary thread 102 and secondary thread 104 can be spawn and execute on two different core partitions, respectively, core partition 106-0 and core partition 106-1. Core partitions can include independent exception and reset circuitry, respective exception unit 112-0 and reset circuit 114-0 and exception unit 112-1 and reset circuit 114-1, to manage exception events and/or reset events on a core partition to minimize or avoid interference with a service thread running in another core partition. An exception event can be a condition that causes a service core to halt normal execution and execute a routine associated with the exception event. A reset event can be a kind of exception that causes a core to enter a reset state.

Primary thread 102 and secondary thread 104 can exchange synchronization (sync) messages (e.g., handshakes) through a heart-beat signal channel such as registers or shared memory in communications channel 120. Secondary thread 104 can perform RAS event processing if a heart-beat is not received from primary thread 102. Secondary thread 104 can perform RAS event handling while the primary thread 102 is offline due to exception or reset, and allow primary thread 102 to perform RAS event handling when primary thread 102 is restored or operational.

For example, communications channel 120 can include memory or registers. Communications channel 120 can store RAS messages and operational status information (e.g., heartbeat). RAS messages can include correctable memory error handling, uncorrectable memory error handling, device interface error (e.g., Peripheral Component Interconnect express (PCIe)), and so forth. Primary thread 102 can access communications channel 120 to provide operational status of a RAS event processing. Secondary thread 104 can access communications channel 120 to retrieve operational status of a RAS event processing by primary thread 102. Based on secondary thread 104 commencing operation of RAS event processing due to failure or time out of primary thread 102, secondary thread 104 can access an uncompleted RAS message corresponding to the RAS message that primary thread 102 did not completely process. A RAS message may remain in mailbox until finished (committed).

Using memory error as an example, RAS handling flow can include a host 130 (e.g., system on chip (SoC)) triggering a hardware error event by issuing an SMI to host firmware or an error pin interruption to OOB firmware. RAS handler can check error source from event register and/or machine check bank, log or dump hardware error (e.g., machine check banks) information into an internal buffer, and report an error event to an operating system. RAS handler can be part of a runtime service running in a primary thread and/or secondary thread. Hardware error information can be stored in persistent storage in BMC or a host OS file system.

Communication channel 120 can include RAS notification channel (e.g., general-purpose input/output (GPIO)) and message channel (e.g., Platform Environment Control Interface (PECI) or Middleware Message Based Interface (MMBI)) provide access to registers or memory to primary thread 102 and secondary thread 104. Message channel can include a shared memory or first in first out (FIFO) data structure. Communication channel 120 can route notifications and messages (e.g., heartbeats and/or operational status messages) to different core partitions in parallel. OOB RAS communication domains can have separate reset circuit control from service core partitions to provide a serviceable communication channel while one service core partition runs into reset status.

Initialization of a channel controller can be handled by primary thread 102 or secondary thread 104. Primary thread 102 and secondary thread 104 can check channel controller status before issuing an initialization sequence to a channel controller in communication channel 120. If the channel controller has been initialized to in-service status, a service thread can abort the initialization sequence of the channel controller. The channel controller status context (e.g., configuration, event flags, etc.) can be cached into primary thread and secondary thread respectively. Primary thread and secondary thread can perform synchronization of channel controller status context.

In some examples, core partition 106-0 and core partition 106-1 can be environments in a BMC. However, core partition 106-0 and core partition 106-1 can be environments in a service processor or auxiliary service processor. A service processor can perform work for system and manageability access. However, in some examples, general purpose cores can provide core partition 106-0 and core partition 106-1.

Figure 2:
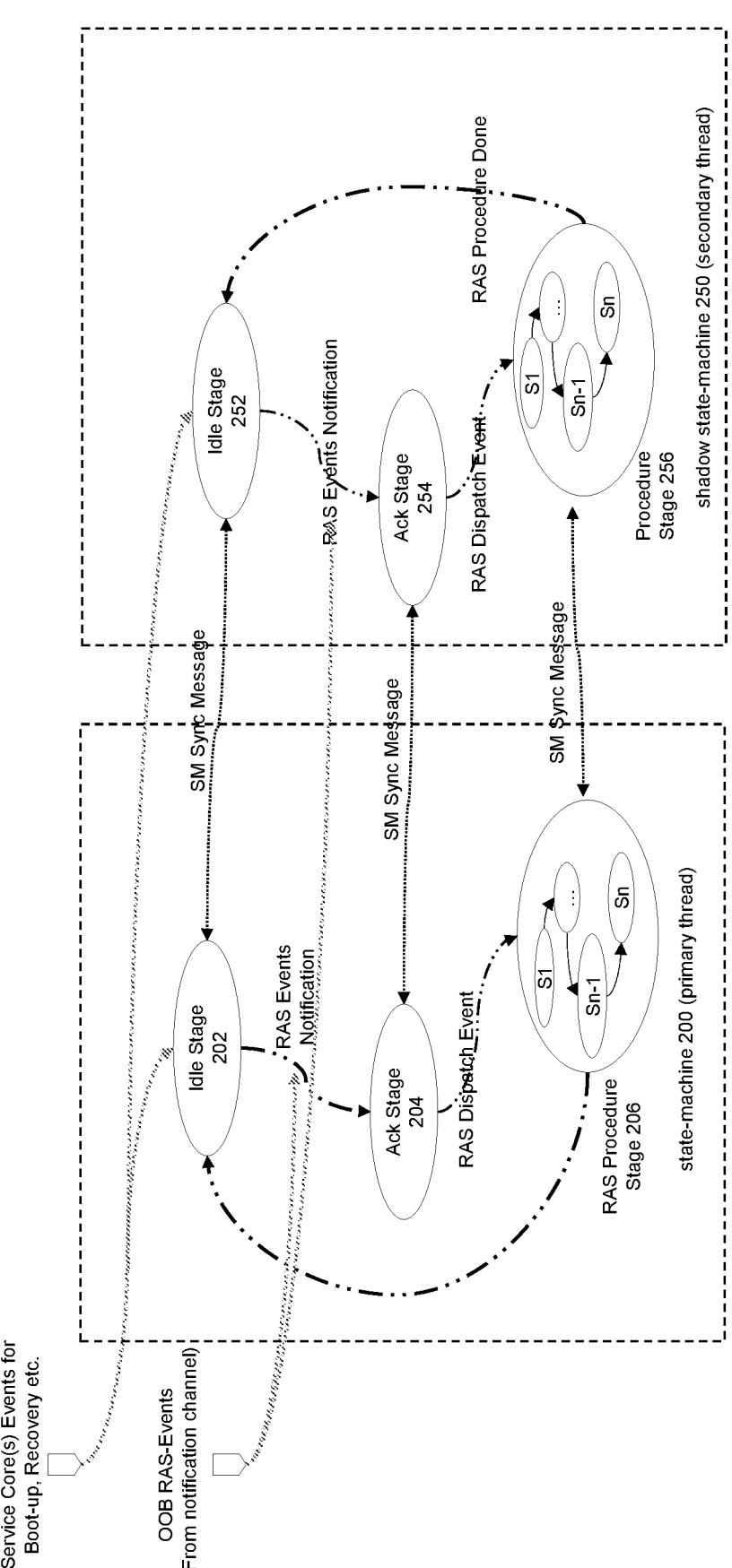
FIG. 2 depicts example performance data.

FIG. 2 depicts an example state machine. The RAS event procedure can be based on a finite-state machine (FSM) including one or more atomic transaction state blocks. Atomic transactions can refer to a set of actions where all actions are to complete or else none of the actions can be considered complete. Primary thread can perform state machine 200 whereas secondary thread can perform state machine 250 that is similar to that of state machine 200.

External events can include service core system event (e.g., boot-up or recovery) or OOB RAS events. A service core system can trigger the service thread running in a corresponding service core to initialize its stage into idle stage 202 and 252. OOB-RAS events from notification channel can report RAS event notification to primary thread state machine 200 and secondary thread state machine 250, which transitions service thread state to Ack stage 204 and 254 from the idle stage.

Idle stage 202 and 254 can indicate no RAS events are to be performed, Ack stage 204 and 254 can indicate an RAS event is detected and is not processed, and procedure stage 206 and 256 can indicate an RAS event is acknowledged and dispatched into corresponding RAS procedure. Procedure stage 206 and 256 can be divided into more sub states so that a sub state is an atomic transaction block. A state block (or sub-state block) can store runtime context for atomic transactions arising from an RAS event procedure.

State transitions can be initiated from a primary thread can be synced to counterpart secondary thread via SM sync message to indicate a completed stage. Uncompleted state transition or aborted state synchronization from primary thread state machine 200 can cause secondary thread state machine 250 to roll-back its context stage to a last completed stage.

An RAS event handler can perform multiple operations, such as RAS event interrupt, error bank access, and error logging, etc.

Figure 3:
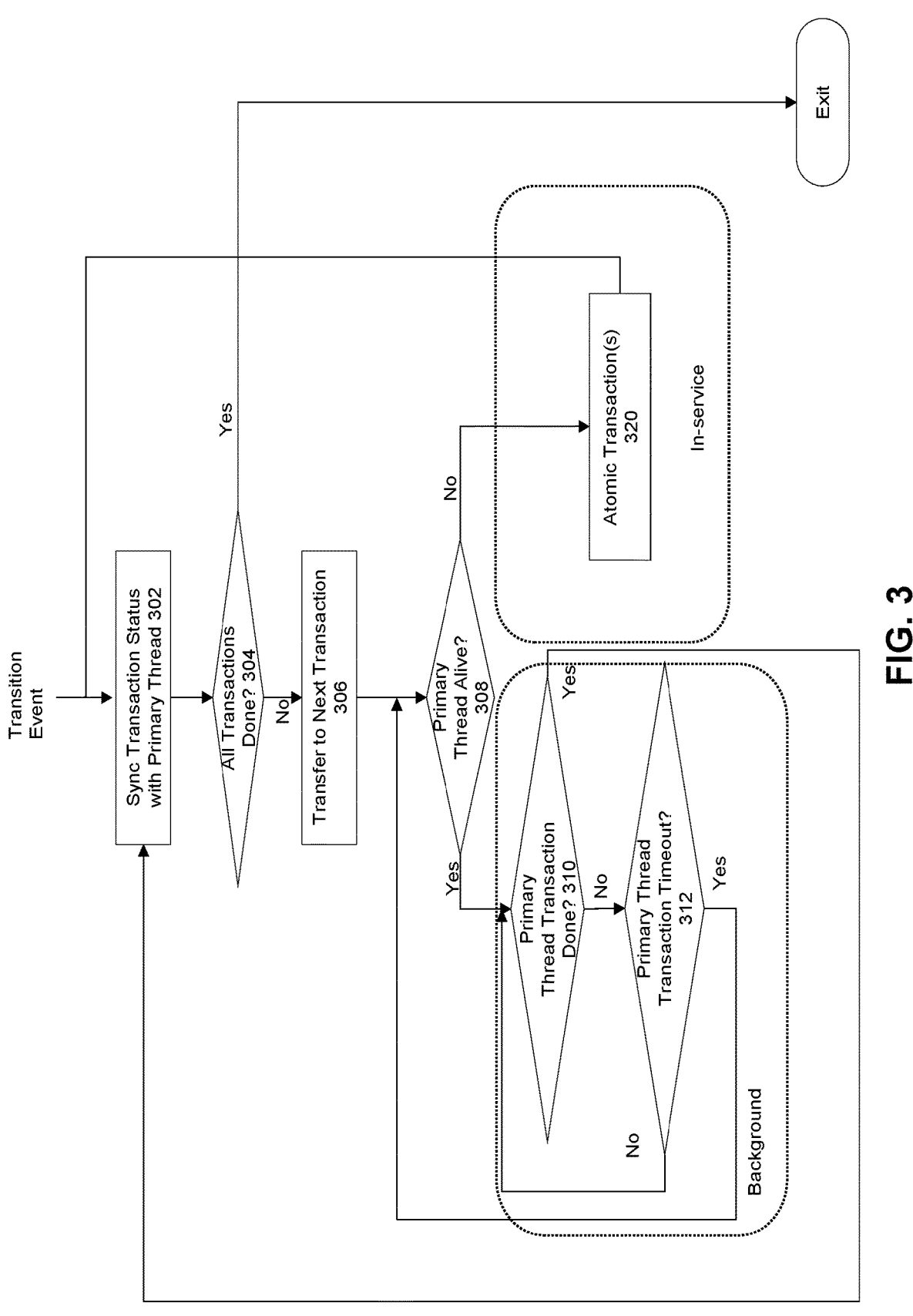
FIG. 3 depicts an example process.

FIG. 3 depicts an example process. One or more instances of a secondary RAS event handler thread can follow the process. At 302, in response to an event transition or completion of an atomic transaction by a secondary thread, the secondary thread can share transaction status with a primary thread. Transaction status can include RAS event completion, current RAS event processing, identification of a RAS event that is currently processed, core partition offline or online, or others. At 304, a determination can be made if transactions are completed. Completion of transactions can include completion of a RAS event processing by a RAS handler. Based on a transaction having been completed, the process can end or perform other operations. Based on a transaction not being completed, the process can continue to 306.

At 306, a transfer to next transaction can occur. For example, a next transaction can refer to another operation or set of operations, such as another atomic sequence of operations to complete a particular RAS event. For example, a next transaction can include an atomic action that includes a set of one or more operations.

At 308, a determination can be made if the primary RAS event handler thread is active or operational. On receipt of a RAS event in a shared mailbox queue, the secondary RAS event handler thread can check for a heartbeat message or operational status message from a primary RAS event handler thread. If the primary RAS event handler thread is active, the secondary RAS event handler thread can rely on a primary RAS event handler thread to process RAS transactions or events. Based on the primary RAS event handler primary thread being active or operational, the process can continue to 310. If no heartbeat message was received from the primary RAS event handler in a specified time check period, the secondary RAS event handler thread can determine the primary RAS event handler thread is offline and proceed to 320. Based on the primary RAS event handler primary thread not being active or operational, the process can continue to 320.

At 310, a determination can be made if a primary RAS event handler thread is complete. A primary transaction thread can be complete based on the primary RAS event handler thread providing a RAS completion message in a mailbox in a register or memory region. Based on the primary transaction thread being complete, the process can proceed to 302. Based on the primary transaction thread not being complete, the process can proceed to 312.

At 312, a determination can be made if an elapsed time of the primary RAS event handler thread processing a RAS event meets or exceeds a threshold. For example, the threshold can be set to a multiple of a time to finish completion of processing an RAS message by an event handler. In some examples, the threshold can be set to two times time to finish completion of processing an RAS message by an event handler based on historic completion times. Based on the elapsed time of the primary RAS event handler thread processing a RAS event meeting or exceeding a threshold, the process can continue to 308, where a next transaction is monitored. A transaction can refer to an atomic transaction (e.g., a sequence of operations served as a single logical unit of work, which happens either in full or not at all).

Based on the elapsed time of the primary RAS event handler thread processing a RAS event meeting or exceeding a threshold, the process can continue to 308, where the primary RAS event handler thread is identified as not alive or non-operational.

At 320, the secondary RAS event handler thread can commence handling of a RAS event. For example, the secondary RAS event handler thread can commence performing atomic transaction(s) as described herein. If primary RAS event handler thread is offline, the secondary RAS event handler thread can process a current RAS event based on latest synchronized state context from primary RAS event handler thread. The secondary RAS event handler thread can synchronize state context as transition events with the primary thread via a mailbox before, while, or after secondary RAS event handler thread transitions into a different state (e.g., Idle to Ack, Ack to Procedure, or Procedure to Idle).

Figure 4:
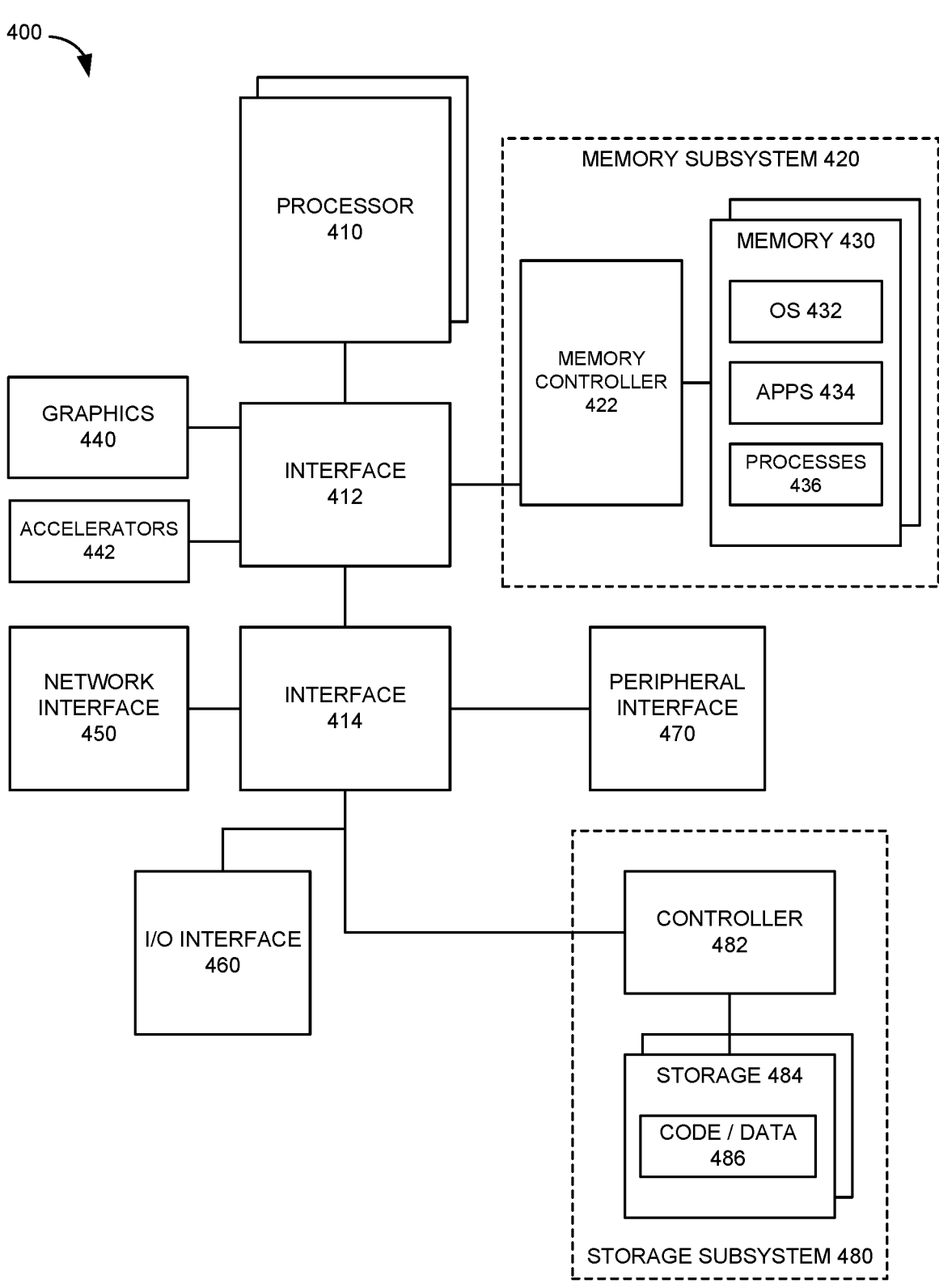
FIG. 4 depicts an example system.

FIG. 4 depicts an example system. Components of system 400 (e.g., processor 410, accelerators 442, and so forth) can be configured to perform primary and secondary RAS event handling, as described herein. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface components 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a fixed function or programmable offload engine that can be accessed or used by a processor 410. For example, an accelerator among accelerators 442 can provide compression (DC) capability, cryptography services such as public key encryption (PKE), cipher, hash/ authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 442 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

OS 432 or BMC software can configure a device to perform primary and secondary RAS event handling, as described herein, as described herein.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include standalone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can transmit data to a device that is in the same data center or rack or a remote device, which can include sending data stored in memory.

Network interface 450 can include one or more of: a network interface controller (NIC), a remote direct memory access (RDMA)-enabled NIC, SmartNIC, router, switch, forwarding element, infrastructure processing unit (IPU), data processing unit (DPU), or network-attached appliance. Some examples of network interface 450 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. A programmable pipeline can be programmed using one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), x86 compatible executable binaries or other executable binaries, or others.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a non-volatile manner, such as one or more magnetic, solid state, or optical based disks, or a combination. Storage 484 holds code or instructions and data 486 in a persistent state (e.g., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (e.g., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory uses refreshing the data stored in the device to maintain state. One example of dynamic volatile memory includes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., Non-Volatile Memory Express (NVMe) Specification, revision 1.3c, published on May 24, 2018 or earlier or later versions, or revisions thereof).

Communications between devices can take place using a network that provides die-to-die communications; chip-to-chip communications; circuit board-to-circuit board communications; and/or package-to-package communications. A die-to-die communications can utilize Embedded Multi-Die Interconnect Bridge (EMIB) or an interposer.

Figure 5:
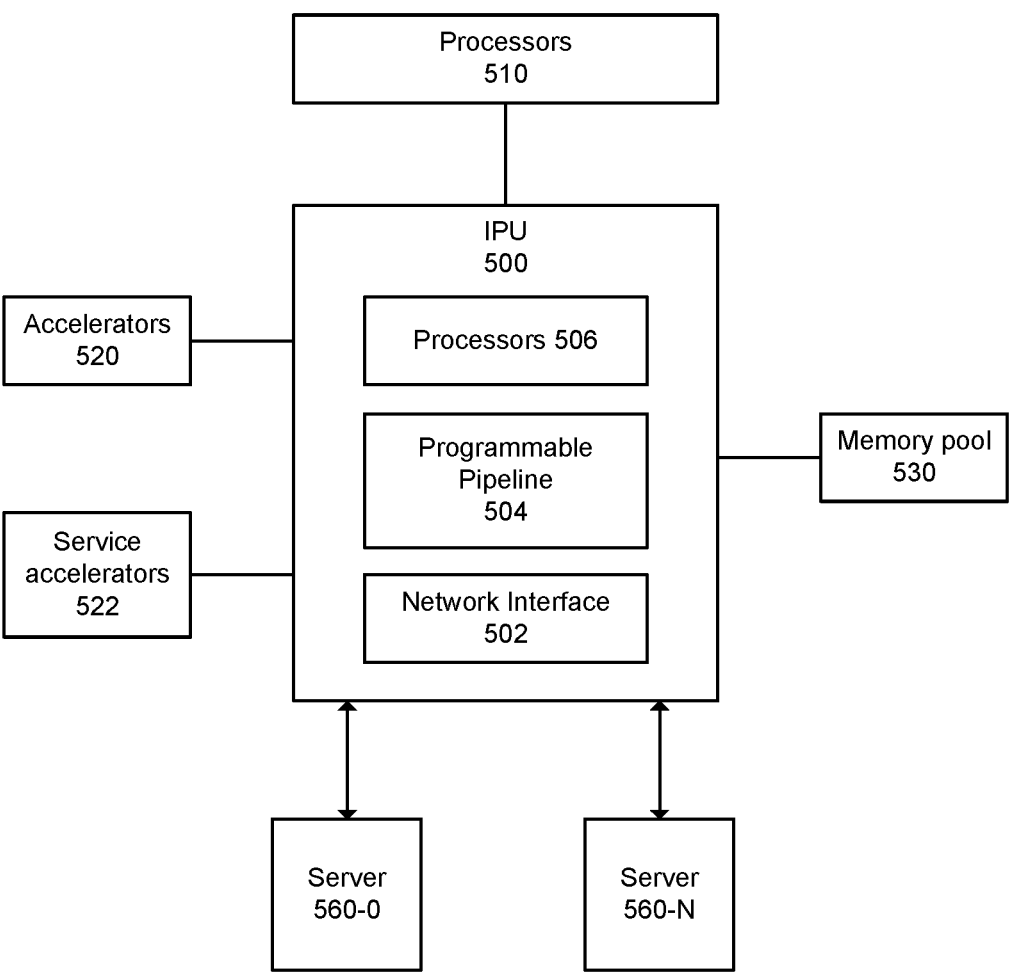
FIG. 5 depicts an example system.

FIG. 5 depicts an example system. In this system, IPU 500 manages performance of one or more processes using one or more of processors 506, processors 510, accelerators 520, memory pool 530, or servers 540-0 to 540-N, where N is an integer of 1 or more. In some examples, processors 506 of IPU 500 can execute one or more processes, applications, VMs, containers, microservices, and so forth that request performance of workloads by one or more of: processors 510, accelerators 520, service accelerators 522, memory pool 530, and/or servers 540-0 to 540-N. IPU 500 can utilize network interface 502 or one or more device interfaces to communicate with processors 510, accelerators 520, memory pool 530, and/or servers 540-0 to 540-N. IPU 500 can utilize programmable pipeline 504 to process packets that are to be transmitted from network interface 502 or packets received from network interface 502. Programmable pipeline 504, processors 506, and/or service accelerators 522 can be configured to perform primary and secondary RAS event handling, as described herein, as described herein.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nano station (e.g., for Point-to-MultiPoint (PtMP) applications), micro data center, on-premise data centers, off-premise data centers, edge network elements, fog network elements, and/or hybrid data centers (e.g., data center that use virtualization, content delivery network (CDN), cloud and software-defined networking to deliver application workloads across physical data centers and distributed multi-cloud environments). Systems and components described herein can be made available for use by a cloud service provider (CSP), or communication service provider (CoSP).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writable or re-writable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes a non-transitory computer-readable medium, comprising instructions stored thereon, that if executed by one or more processors, cause the one or more processors to: execute multiple Reliability Availability Serviceability (RAS) processes on different processors of the one or more processors to provide fallback from a first RAS process to a second RAS process executing on a processor of the one or more processors based on failure or timeout of the first RAS process.

Example 2 includes one or more examples, wherein the different processors comprise independently operating processors whereby failure or inoperability of one of the different processors is independent of another of the different processors.

Example 3 includes one or more examples, wherein failure or timeout of the first RAS process comprises: failure of the second RAS process to receive an operating status signal from the first RAS process.

Example 4 includes one or more examples, wherein the second RAS process is to receive an operating status signal from the first RAS process by reading a register or memory region.

Example 5 includes one or more examples, wherein fallback from a first RAS process to a second RAS process executing on a processor of the one or more processors comprises the second RAS process accessing a RAS event uncompleted by the first RAS process.

Example 6 includes one or more examples, wherein the RAS event comprises one or more of: correctable memory error handling, uncorrectable memory error handling, or device interface error.

Example 7 includes one or more examples, wherein the first RAS process and the second RAS process comprise finite-state machine (FSM) including one or more atomic transaction state blocks.

Example 8 includes one or more examples, and includes an apparatus comprising: at least two processors to execute multiple Reliability Availability Serviceability (RAS) processes on different processors of the at least two processors to provide fallback from a first RAS process to a second RAS process executing on a processor of the at least two processors based on failure or timeout of the first RAS process.

Example 9 includes one or more examples, wherein the different processors comprise independently operating processors whereby failure or inoperability of one of the different processors is independent of another of the different processors.

Example 10 includes one or more examples, wherein failure or timeout of the first RAS process comprises: failure of the second RAS process to receive an operating status signal from the first RAS process.

Example 11 includes one or more examples, wherein the second RAS process is to receive an operating status signal from the first RAS process by reading a register or memory region.

Example 12 includes one or more examples, wherein the fallback from a first RAS process to a second RAS process executing on a processor of the one or more processors comprises the second RAS process accessing a RAS event uncompleted by the first RAS process.

Example 13 includes one or more examples, wherein the RAS event comprises one or more of: correctable memory error handling, uncorrectable memory error handling, or device interface error.

Example 14 includes one or more examples, wherein the first RAS process and the second RAS process comprise finite-state machine (FSM) including one or more atomic transaction state blocks.

Example 15 includes one or more examples, and includes a method comprising: executing multiple Reliability Availability Serviceability (RAS) processes on different processors to provide fallback from a first RAS process to a second RAS process executing on a processor based on failure or timeout of the first RAS process.

Example 16 includes one or more examples, wherein the different processors are in different processor partitions.

Example 17 includes one or more examples, wherein failure or timeout of the first RAS process comprises: failure of the second RAS process to receive an operating status signal from the first RAS process.

Example 18 includes one or more examples, wherein the second RAS process is to receive an operating status signal from the first RAS process by reading a register or memory region.

Example 19 includes one or more examples, wherein the first and second processes are to handle RAS events and wherein RAS events comprise one or more of: correctable memory error handling, uncorrectable memory error handling, or device interface error.

Example 20 includes one or more examples, wherein the first RAS process and the second RAS process comprise finite-state machine (FSM) including one or more atomic transaction state blocks.

What is claimed is:

1. At least one non-transitory computer-readable medium, comprising instructions stored thereon, that if executed by one or more processors, cause the one or more processors to:

execute multiple Reliability Availability Serviceability (RAS) processes on different processors of the two or more processors to provide fallback from a first RAS process to a second RAS process executing on a processor of the one or more processors based on failure or timeout of the first RAS process, wherein the first RAS process performs a corrective action in response to an indication of a memory or device interface error and wherein the first RAS process and the second RAS process comprise at least one finite-state machine (FSM) including one or more atomic transaction state blocks.

2. The computer-readable medium of claim 1, wherein the different processors comprise independently operating processors whereby failure or inoperability of one of the different processors is independent of another of the different processors.

3. The computer-readable medium of claim 1, wherein failure or timeout of the first RAS process comprises:

failure of the second RAS process to receive an operating status signal from the first RAS process.

4. The computer-readable medium of claim 3, wherein the second RAS process is to receive an operating status signal from the first RAS process by reading a register or memory region and wherein the operating status signal indicates whether the first RAS process is operational.

5. The computer-readable medium of claim 1, wherein the fallback from the first RAS process to the second RAS process executing on a processor of the one or more processors comprises the second RAS process accessing a RAS event uncompleted by the first RAS process.

6. The computer-readable medium of claim 1, wherein the corrective action performs one or more of: correctable memory error handling, uncorrectable memory error handling, or handling a device interface error.

7. The computer-readable medium of claim 1, wherein failure or timeout of the first RAS process comprises:

failure of the first RAS process to complete processing a RAS message within a configured amount of time.

8. An apparatus comprising:

at least two processors to execute multiple Reliability Availability Serviceability (RAS) processes on different processors of the at least two processors to provide fallback from a first RAS process to a second RAS process executing on a processor of the at least two processors based on failure or timeout of the first RAS process, wherein the first RAS process is to perform a corrective action in response to an indication of a memory or device interface error and wherein the first RAS process and the second RAS process comprise at least one finite-state machine (FSM) including one or more atomic transaction state blocks.

9. The apparatus of claim 8, wherein the different processors comprise independently operating processors whereby failure or inoperability of one of the different processors is independent of another of the different processors.

10. The apparatus of claim 8, wherein failure or timeout of the first RAS process comprises:

failure of the second RAS process to receive an operating status signal from the first RAS process.

11. The apparatus of claim 10, wherein the second RAS process is to receive an operating status signal from the first RAS process by reading a register or memory region.

12. The apparatus of claim 8, wherein the fallback from a first RAS process to a second RAS process executing on a processor of the at least two processors comprises the second RAS process accessing a RAS event uncompleted by the first RAS process.

13. The apparatus of claim 12, wherein the RAS event comprises one or more of:

correctable memory error handling, uncorrectable memory error handling, or device interface error.

14. A method comprising:

executing multiple Reliability Availability Serviceability (RAS) processes on different processors to provide fallback from a first RAS process to a second RAS process executing on a processor based on failure or timeout of the first RAS process, wherein the first RAS process performs a corrective action in response to an indication of a memory or device interface error and wherein the first RAS process and the second RAS process comprise at least one finite-state machine (FSM) including one or more atomic transaction state blocks.

15. The method of claim 14, wherein the different processors are in different processor partitions.

16. The method of claim 14, wherein the second RAS process is to receive an operating status signal from the first RAS process by reading a register or memory region.

17. The method of claim 14, wherein the first and second processes are to handle RAS events and wherein RAS events comprise one or more of: correctable memory error handling, uncorrectable memory error handling, or device interface error.

* * * * *